(12) United States Patent
Lai et al.

(10) Patent No.: US 12,211,491 B2
(45) Date of Patent: Jan. 28, 2025

(54) SELF-SUPERVISED SPEECH RECOGNITION

(71) Applicants: International Business Machines Corporation, Armonk, NY (US); MASSACHUSETTS INSTITUTE OF TECHNOLOGY, Cambridge, MA (US)

(72) Inventors: Cheng-I Lai, Cambridge, MA (US); Yang Zhang, Cambridge, MA (US); Kaizhi Qian, Champaign, IL (US); Chuang Gan, Cambridge, MA (US); James R. Glass, Winchester, MA (US); Alexander Haojan Liu, Malden, MA (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 17/662,435

(22) Filed: May 9, 2022

(65) Prior Publication Data

US 2023/0360642 A1   Nov. 9, 2023

(51) Int. Cl.
*G10L 15/01* (2013.01)
*G06N 3/082* (2023.01)
*G10L 15/16* (2006.01)

(52) U.S. Cl.
CPC .............. *G10L 15/16* (2013.01); *G06N 3/082* (2013.01); *G10L 15/01* (2013.01)

(58) Field of Classification Search
CPC . G10L 15/16; G10L 15/01; G10L 2015/0635; G10L 15/063; G06N 3/082; G06N 3/0495; G06N 3/084; G06N 3/0895
See application file for complete search history.

(56) References Cited

U.S. PATENT DOCUMENTS

| | | |
|---|---|---|
| 10,373,054 B2 | 8/2019 | Goel |
| 10,643,602 B2 | 5/2020 | Li |
| 10,943,583 B1 | 3/2021 | Gandhe |

(Continued)

OTHER PUBLICATIONS

Cheng-I Jeff Lai, Yang Zhang, Alexander H. Liu, Shiyu Chang, Yi-Lun Liao, Yung-Sung Chuang, Kaizhi Qian, Sameer Khurana, David Cox, James Glass, "PARP: Prune, Adjust and Re-Prune for Self-Supervised Speech Recognition," arXiv:2106.05933, Jun. 10, 2021 (Year: 2021).*

(Continued)

*Primary Examiner* — Paras D Shah
*Assistant Examiner* — Mulugeta Tuji Dugda
(74) *Attorney, Agent, or Firm* — Randy Tejeda

(57) ABSTRACT

One or more computer processors obtain an initial subnetwork at a target sparsity and an initial pruning mask from a pre-trained self-supervised learning (SSL) speech model. The one or more computer processors finetune the initial subnetwork, comprising: the one or more computer processors zero out one or more masked weights in the initial subnetwork specified by the initial pruning mask; the one or more computer processors train a new subnetwork from the zeroed out subnetwork; the one or more computer processors prune one or more weights of lowest magnitude in the new subnetwork regardless of network structure to satisfy the target sparsity. The one or more computer processors classify an audio segment with the finetuned subnetwork.

20 Claims, 17 Drawing Sheets

(56) References Cited

U.S. PATENT DOCUMENTS

| 11,887,583 B1* | 1/2024 | Strimel | G10L 15/16 |
| 2019/0121837 A1* | 4/2019 | Azizi | G06F 9/30036 |
| 2019/0362235 A1* | 11/2019 | Xu | G06N 3/04 |
| 2021/0125071 A1* | 4/2021 | Ren | G06N 3/04 |

OTHER PUBLICATIONS

"Improving Named Entity Recognition in Speech through Multi-pass Search Space Pruning Utilizing Redundant Information in Partially Recognized Co-occuring Entities", An IP.com Prior Art Database Technical Disclosure, Original Publication Date: Feb. 19, 2009, IP.com No. IPCOM000179615D, 3 pages.

"Transcription of speech data with minimal manual effort", An IP.com Prior Art Database Technical Disclosure, Original Publication Date: Jun. 8, 2004, IP.com No. IPCOM000028925D, 8 pages.

Cao et al., "Low-Complexity Probing via Finding Subnetworks", arXiv:2104.03514v1 [cs.CL] Apr. 8, 2021, 7 pages.

Disclosed Anonymously, "Contextual Speech Recognition Using Rescore-Aware Pruning", An IP.com Prior Art Database Technical Disclosure, IP.com No. IPCOM000252757D, IP.com Electronic Publication Date: Feb. 8, 2018, 9 pages.

Lai et al., "PARP: Prune, Adjust and Re-Prune for Self-Supervised Speech Recognition", Grace Period Disclosure, arXiv:2106.05933v1 [cs.CL] Jun. 10, 2021, 29 pages.

\* cited by examiner

Algorithm 1 Prune-Adjust-Re-Prune (PARP) to target sparsity s

1: Assume there are $N$ model updates in target task/language $l$'s downstream finetuning.
2: Take a pre-trained SSL $f(x; \theta_0)$ model. Apply task-agnostic subnetwork discovery, such as MPI[4], at target sparsity $s$ to obtain initial subnetwork $f(x; m_0 \odot \theta_0)$. Set $m = m_0$ and variable $n_1 = 0$.
3: repeat
4:   Zero-out masked-out weights in $\theta_{n1}$ given by $m$. Lift up $m$ such that whole $\theta_{n1}$ is updatable.
5:   Train $f(x; \theta_{n1})$ for $n$ model updates and obtain $f(x; \theta_{n2})$.
6:   Apply UMP on $f(x; \theta_{n2})$ and adjust $m$ accordingly. The adjusted subnetwork is $f(x; m \odot \theta_{n2})$. Set variable $n_1 = n_2$.
7: until total model updates reach $N$.
8: Return finetuned sbnetwork $f(x; m \odot \theta_N)$.

FIG. 4

Language OMP Mask IOU at 50% Sparsity in wav2vec 2.0

| Target \ Source | es | fr | it | ky | nl | ru | sv_SE | tr | tt | zh_TW |
|---|---|---|---|---|---|---|---|---|---|---|
| es | 1 | 0.971 | 0.968 | 0.967 | 0.965 | 0.964 | 0.973 | 0.969 | 0.966 | 0.963 |
| fr | 0.971 | 1 | 0.968 | 0.968 | 0.966 | 0.965 | 0.974 | 0.97 | 0.967 | 0.965 |
| it | 0.968 | 0.968 | 1 | 0.964 | 0.962 | 0.961 | 0.969 | 0.966 | 0.963 | 0.96 |
| ky | 0.967 | 0.968 | 0.964 | 1 | 0.962 | 0.962 | 0.969 | 0.967 | 0.965 | 0.961 |
| nl | 0.965 | 0.966 | 0.962 | 0.962 | 1 | 0.959 | 0.967 | 0.964 | 0.961 | 0.959 |
| ru | 0.964 | 0.965 | 0.961 | 0.962 | 0.959 | 1 | 0.965 | 0.963 | 0.961 | 0.958 |
| sv_SE | 0.973 | 0.974 | 0.969 | 0.969 | 0.967 | 0.965 | 1 | 0.971 | 0.968 | 0.966 |
| tr | 0.969 | 0.97 | 0.966 | 0.967 | 0.964 | 0.963 | 0.971 | 1 | 0.966 | 0.963 |
| tt | 0.966 | 0.967 | 0.963 | 0.965 | 0.961 | 0.961 | 0.968 | 0.966 | 1 | 0.96 |
| zh_TW | 0.963 | 0.965 | 0.96 | 0.961 | 0.959 | 0.958 | 0.966 | 0.963 | 0.96 | 1 |
| MPI | 0.977 | 0.979 | 0.972 | 0.972 | 0.97 | 0.968 | 0.982 | 0.975 | 0.971 | 0.969 |
| RP | 0.333 | 0.333 | 0.333 | 0.333 | 0.333 | 0.333 | 0.333 | 0.333 | 0.333 | 0.333 |

Language OMP Mask IOU at 50% Sparsity in XLSR-53

| Target \ Source | es | fr | it | ky | nl | ru | sv_SE | tr | tt | zh_TW |
|---|---|---|---|---|---|---|---|---|---|---|
| es | 1 | 0.943 | 0.939 | 0.938 | 0.944 | 0.936 | 0.933 | 0.944 | 0.94 | 0.943 |
| fr | 0.943 | 1 | 0.936 | 0.935 | 0.941 | 0.933 | 0.93 | 0.941 | 0.937 | 0.939 |
| it | 0.939 | 0.936 | 1 | 0.931 | 0.936 | 0.93 | 0.927 | 0.936 | 0.933 | 0.935 |
| ky | 0.938 | 0.935 | 0.931 | 1 | 0.936 | 0.93 | 0.927 | 0.938 | 0.936 | 0.935 |
| nl | 0.944 | 0.941 | 0.936 | 0.936 | 1 | 0.934 | 0.932 | 0.942 | 0.939 | 0.941 |
| ru | 0.936 | 0.933 | 0.93 | 0.93 | 0.934 | 1 | 0.925 | 0.935 | 0.932 | 0.933 |
| sv_SE | 0.933 | 0.93 | 0.927 | 0.927 | 0.932 | 0.925 | 1 | 0.932 | 0.929 | 0.93 |
| tr | 0.9444 | 0.941 | 0.936 | 0.938 | 0.942 | 0.935 | 0.932 | 1 | 0.94 | 0.941 |
| tt | 0.94 | 0.937 | 0.933 | 0.936 | 0.939 | 0.932 | 0.929 | 0.94 | 1 | 0.938 |
| zh_TW | 0.943 | 0.939 | 0.935 | 0.935 | 0.941 | 0.933 | 0.93 | 0.941 | 0.938 | 1 |
| MPI | 0.959 | 0.954 | 0.948 | 0.948 | 0.956 | 0.946 | 0.942 | 0.956 | 0.952 | 0.956 |
| RP | 0.333 | 0.333 | 0.333 | 0.333 | 0.333 | 0.333 | 0.333 | 0.333 | 0.333 | 0.333 |

| Method | test clean | test other |
|---|---|---|
| Continuous BERT + LM | 49.5 | 66.3 |
| Discrete BERT + LM | 16.3 | 25.2 |
| wav2vec2-base reported | 46.9 | 50.9 |
| wav2vec2-large reported | 43.5 | 45.3 |
| wav2vec2-base replicated | 49.3 | 53.2 |
| wav2vec2-large replicated | 46.3 | 48.1 |
| wav2vec2-base w/ 10% PARP | 38.0 | 44.3 |
| wav2vec2-large w/ 10% PARP | 33.7 | 37.2 |

| Method | # ASR finetuning | test clean | test other |
|---|---|---|---|
| RP + sub-finetuning | 1 | 94.5 | 96.4 |
| MPI + sub-finetuning | 1 | 93.6 | 96.1 |
| OMP + sub-finetuning | 2 | 92.0 | 95.3 |
| IMP + sub-finetuning | 10 | 89.6 | 93.9 |
| PARP (90% → 90%) | 1 | 83.6 | 90.7 |
| PARP-P | | | |
| 70% → 90% | 1 | 51.9 | 69.1 |
| 60% → 80% → 90% | 2 | 33.6 | 53.3 |

FIG. 7

| Method | Pre-training | Sparsity | avg. Per |
|---|---|---|---|
| Bottleneck | Babel-1070h | 0% | 44.9 |
| CPC Modified | LS-100h | 0% | 50.9 |
| CPC | LS-360h | 0% | 44.5 |
| wav2vec2-base | LS-960h | 0% | 18.7 |
| wav2vec2 + OMP | LS-960h | 70% | 41.3 |
| wav2vec2 + PARP | LS-960h | 90% | 40.1 |
| xlsr reported | 56,000h | 0% | 7.6 |
| xlsr replicated | 56,000h | 0% | 9.9 |
| xlsr + OMP | 56,000h | 90% | 33.9 |
| xlsr + PARP-P | 56,000h | 90% | 22.9 |

Transferability of Language Masks at 50% Sparsity in wav2vec 2.0

| | es | fr | it | ky | nl | ru | sv_SE | tr | tt | zh_TW |
|---|---|---|---|---|---|---|---|---|---|---|
| es (50%) | 0 | 1.191 | 1.465 | 2.075 | 1.159 | 6.089 | 1.954 | 2.89 | 2.701 | 2.456 |
| fr (50%) | 0.979 | 0 | 1.564 | 1.849 | 0.954 | 7.284 | 1.88 | 2.698 | 3.032 | 2.124 |
| it (50%) | 0.496 | 1.67 | 0 | 1.996 | 4.302 | 5.083 | 2.003 | 2.66 | 2.628 | 2.337 |
| ky (50%) | 1.264 | 1.805 | 1.644 | 0 | 1.951 | 5.875 | 2.168 | 1.761 | 1.766 | 3.264 |
| nl (50%) | 0.976 | 0.706 | 3.056 | 1.989 | 0 | 7.782 | 1.219 | 2.682 | 2.498 | 3.26 |
| ru (50%) | 1.187 | 1.989 | 1.303 | 6.472 | 1.279 | 0 | 1.934 | 3.084 | 2.524 | 2.235 |
| sv_SE (50%) | 1.221 | 5.181 | 1.912 | 3.828 | 2.447 | 3.551 | 0 | 2.839 | 2.868 | 2.499 |
| tr (50%) | 1.49 | 1.927 | 7.424 | 1.247 | 1.74 | 2.956 | 2.073 | 0 | 2.037 | 2.025 |
| tt (50%) | 1.283 | 1.67 | 1.663 | 0.969 | 1.077 | 2.713 | 2.114 | 2.43 | 0 | 2.226 |
| zh_TW (50%) | 1.191 | 1.731 | 1.937 | 2.353 | 1.266 | 3.374 | 2.233 | 3.113 | 2.785 | 0 |
| RP (50%) | 15.758 | 23.794 | 18.004 | 18.837 | 20.08 | 18.287 | 21.098 | 22.116 | 17.116 | 19.115 |

Subnetworks obtained from Source Language (Sparsity %)

Finetune subnetworks on Target Language

FIG. 13A

Transferability of Language Masks at 50% Sparsity in wav2vec 2.0 with PARP

| | es | fr | it | ky | nl | ru | sv_SE | tr | tt | zh_TW |
|---|---|---|---|---|---|---|---|---|---|---|
| es (50%) | 0 | -1.903 | -1.539 | -0.553 | -1.162 | -0.093 | -2 | -0.265 | -0.303 | 0.088 |
| fr (50%) | -0.568 | 0 | -0.48 | -0.641 | -0.884 | -0.289 | -0.3 | -0.134 | -0.841 | 0.155 |
| it (50%) | -0.515 | -0.957 | 0 | -1.014 | -0.149 | 0.115 | -0.591 | 0.52 | -0.754 | -0.152 |
| ky (50%) | 0.526 | -0.613 | -1.083 | 0 | -1.01 | -0.661 | -1.86 | 1.162 | -1.081 | -0.702 |
| nl (50%) | -0.668 | -1.338 | 0.104 | -0.755 | 0 | 0.225 | -0.809 | -0.134 | -0.801 | 0.23 |
| ru (50%) | -0.077 | -1.031 | 1.348 | 0.409 | -0.966 | 0 | 1.979 | -0.01 | -0.464 | -0.067 |
| sv_SE (50%) | 0.384 | -1.362 | -1.083 | -0.733 | -0.3 | -0.551 | 0 | -0.045 | -0.664 | 0.555 |
| tr (50%) | -0.05 | -1.019 | -0.74 | 0 | -0.78 | 0.142 | -1.675 | 0 | -1.021 | -0.726 |
| tt (50%) | 0.234 | -1.154 | -0.527 | -0.841 | -0.77 | 0.71 | -1.56 | -0.654 | 0 | -0.622 |
| zh_TW (50%) | -0.357 | -1.154 | 0.406 | -0.075 | 0.543 | 0.233 | -1.306 | 0.411 | -0.267 | 0 |
| RP (50%) | 16.533 | 23.856 | 18.695 | 19.832 | 20.168 | 20.74 | 20.478 | 23.35 | 18.271 | 19.457 |

Subnetworks obtained from Source Language (Sparsity %)

Finetune subnetworks on Target Language

FIG. 13B

| Method | Averaged transferred subnetworks performance found at 70% sparsity | | | | | | | | |
|---|---|---|---|---|---|---|---|---|---|
| | CoLA | MRPC | QNLI | QQP | RTE | SST-2 | STS-B | WNLI | MNLI |
| Same-task Transfer (top line) | 40.65 | 76.23 | 89.36 | 91.07 | 59.93 | 90.60 | 86.85 | 56.34 | 82.87 |
| PARP | 28.48 | 75.98 | 87.12 | 90.40 | 59.69 | 89.59 | 86.25 | 54.62 | 81.61 |
| BERT-Ticket | 10.12 | 71.94 | 86.54 | 88.50 | 57.59 | 88.80 | 80.27 | 54.03 | 80.48 |

FIG. 14

SELF-SUPERVISED SPEECH RECOGNITION

BACKGROUND

The present invention relates generally to the field of machine learning, and more particularly to speech recognition.

Speech recognition is an interdisciplinary subfield of computer science and computational linguistics that develops methodologies and technologies that enable the recognition and translation of spoken language into text by computers with the main benefit of searchability. It is also known as automatic speech recognition (ASR), computer speech recognition or speech to text (STT).

SUMMARY

Embodiments of the present invention disclose a computer-implemented method, a computer program product, and a system. The computer-implemented method includes one or more computer processers obtaining an initial subnetwork at a target sparsity and an initial pruning mask from a pre-trained self-supervised learning (SSL) speech model. The one or more computer processors finetune the initial subnetwork, comprising: the one or more computer processors zero out one or more masked weights in the initial subnetwork specified by the initial pruning mask; the one or more computer processors train a new subnetwork from the zeroed out subnetwork; the one or more computer processors prune one or more weights of lowest magnitude in the new subnetwork regardless of network structure to satisfy the target sparsity. The one or more computer processors classify an audio segment with the finetuned subnetwork.

BRIEF DESCRIPTION OF THE DRAWINGS

FIG. 4 is an exemplary algorithm, in accordance with an embodiment of the present invention;

FIGS. 5A and 5B are a set of matrices depicting experimental results of the program, in accordance with an embodiment of the present invention;

FIG. 7 is a table depicting experimental results of the program, in accordance with an embodiment of the present invention;

FIG. 8 is a table depicting experimental results of the program, in accordance with an embodiment of the present invention;

FIGS. 13A and 13B are a set of matrices depicting experimental results of the program, in accordance with an embodiment of the present invention;

FIG. 14 is a table depicting experimental results of the program, in accordance with an embodiment of the present invention;

DETAILED DESCRIPTION

For many low-resource spoken languages in the world, collecting large-scale transcribed corpora is very costly and sometimes infeasible. Automatic Speech Recognition (ASR) trained without sufficient transcribed speech data has been a critical yet challenging research agenda in speech processing. Recently, Self-Supervised Speech Representation Learning (speech SSL) has emerged as a promising pathway toward solving low-resource ASR. Speech SSL involves pre-training a speech representation module on large-scale unlabeled data with a self-supervised learning objective, followed by finetuning on a small number of supervised transcriptions. Many recent studies have demonstrated the empirical successes of speech SSL on low-resource English and multi-lingual ASR, matching systems trained on fully-supervised. Prior works, however, focus on pre-training objectives, scaling up speech representation modules, or pre-training data selections.

Recent work on speech self-supervised learning (speech SSL) has demonstrated the benefits of scale in learning rich and transferable representations for Automatic Speech Recognition (ASR) with limited parallel data. However, directly applying widely adopted pruning methods such as the Lottery Ticket Hypothesis (LTH) is suboptimal in the computational cost needed. Moreover, contrary to what LTH predicts, the discovered subnetworks yield minimal performance gain compared to the original dense network. Neural network pruning, as well as the more recently proposed Lottery Ticket Hypothesis (LTH), provides a potential solution that accomplishes both objectives. According to LTH, there exists sparse subnetworks that can achieve the same or even better accuracy than the original dense network. Such phenomena have been successfully observed in various domains: Natural Language Processing (NLP), Computer Vision (CV), and many others. All finding sparse subnetworks with comparable or better performance than the dense network.

Figure 6:
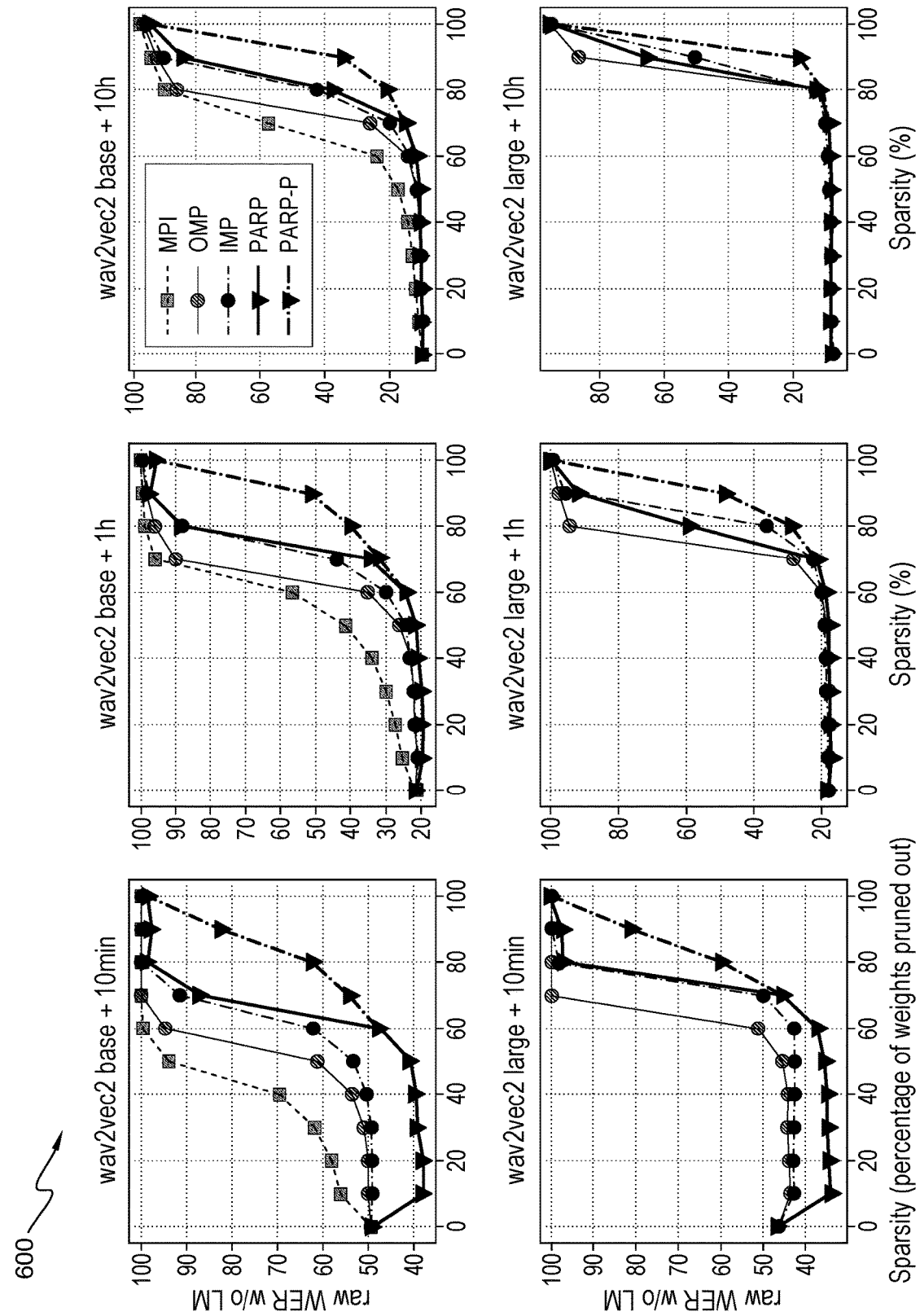
FIG. 6 is a set of graphs depicting experimental results of the program, in accordance with an embodiment of the present invention.

However, directly applying widely-adopted pruning methods, such as One-Shot Magnitude Pruning (OMP) and Iterative Magnitude Pruning (IMP), to pre-trained speech SSL suffers from two challenges. First, adopting these methods in the conventional pruning framework is extremely time-consuming for SOTA speech SSL models. OMP and IMP involve more than one round of finetuning on downstream tasks (i.e., FIG. 3), and finetuning for ASR is time consuming and computationally demanding. The second challenge is that there is no performance improvement of the subnetworks over the original dense network with OMP or IMP. FIG. 6 shows the word error rate (WER) under low-resource scenarios of the subnetworks identified by OMP (purple line) and IMP (blue dashed line) at different sparsity levels. None of the sparsity levels achieves a visible drop in WER compared to the zero sparsity case, corresponding to the original dense network.

The present invention introduces Prune-Adjust-Re-Prune (PARP), an intuitive pruning method for self-supervised speech recognition through sparse subnetwork discovery within pre-trained speech SSL. Embodiments of the present invention demonstrate better subnetworks than baseline pruning methods while requiring a fraction of their computational cost; demonstrate subnetworks yields over 10% WER reduction over the full model; demonstrate minimal cross lingual subnetwork adaptation errors; and discover a shared subnetwork for multiple spoken languages in one pass, on pruning pre-trained ASR models (e.g., wav2vec) under three low-resource settings. Embodiments of the present invention extend modern-day speech technology to many under-explored low-resource spoken languages. Embodiments of the present invention introduce a new and flexible pruning technique to current and future speech SSL frameworks that reduces the computational costs required for adapting (finetuning) to custom settings. Embodiments of the present invention identify sparse subnetworks within a pre-trained speech SSL that achieve superior performance to the full pre-trained model on downstream ASR tasks. Embodiments of the present invention recognize that on low-resource English and multilingual ASR sparse subnetworks exist in pre-trained speech SSL, and the computational advantage and performance gain of the present invention over baseline pruning methods. Embodiments of the present invention demonstrate that PARP mitigates performance degradation in cross-lingual mask transfer, and the possibility of discovering a single subnetwork for 10 spoken languages in one run. Implementation of embodiments of the invention may take a variety of forms, and exemplary implementation details are discussed subsequently with reference to the Figures.

The present invention will now be described in detail with reference to the Figures.

Figure 1:
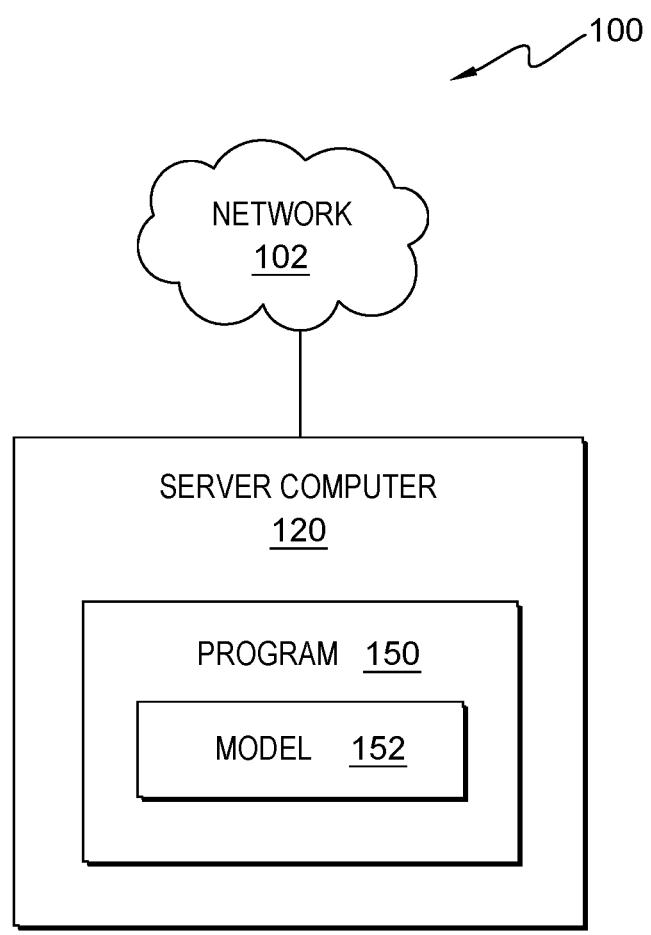
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes program 150. In other embodiments, server computer 120 may contain other applications, databases, programs, etc. which have not been depicted in computational environment 100. Server computer 120 may include internal and external hardware components, as depicted and described in further detail with respect to FIG. 16.

Program 150 is a program for self-supervised speech recognition through discovering sparse subnetworks within pre-trained speech SSL, wherein the sparse subnetworks minimize downstream ASR WER and achieve minimal finetuning loss. In various embodiments, program 150 may implement the following steps: obtain an initial subnetwork at a target sparsity and an initial pruning mask from a pre-trained self-supervised learning (SSL) speech model; finetune the initial subnetwork, comprising: zero out one or more masked weights in the initial subnetwork specified by the initial pruning mask; train a new subnetwork from the zeroed out subnetwork; prune one or more weights of lowest magnitude in the new subnetwork regardless of network structure to satisfy the target sparsity; classify an audio segment with the finetuned subnetwork. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes model 152. Program 150 is depicted and described in further detail with respect to FIG. 2.

Model 152 is representative of a model utilizing deep learning techniques to train, calculate weights, ingest inputs, and output a plurality of solution vectors. In an embodiment, model 152 is comprised of any combination of deep learning model, technique, and algorithm. In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. The training of model 152 is depicted and described in further detail with respect to FIG. 2.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
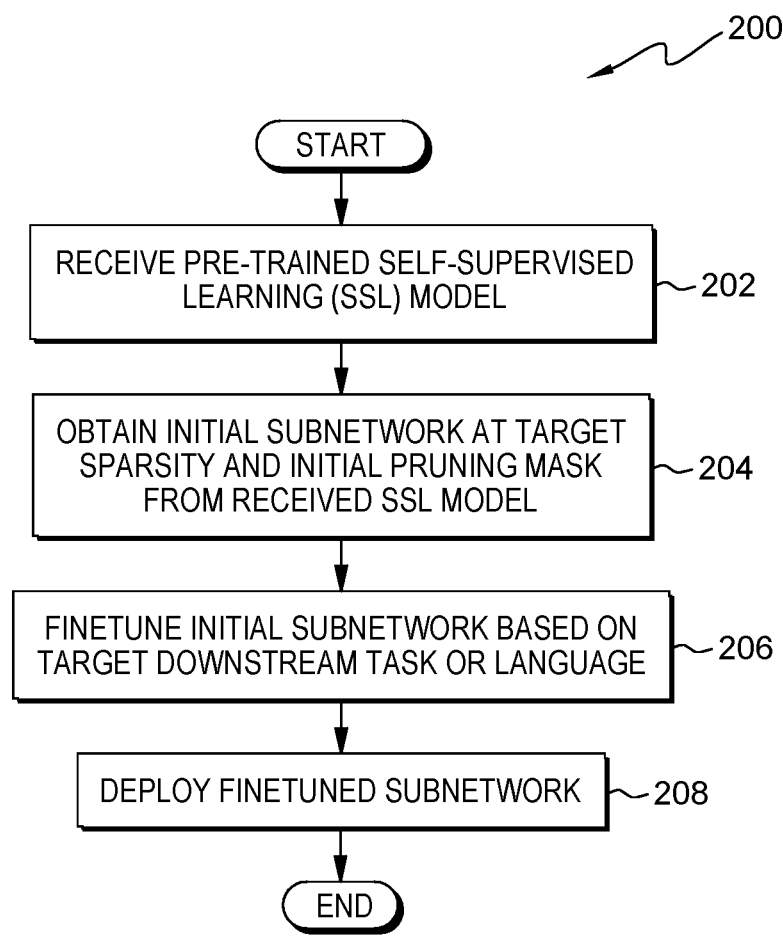
FIG. 2 is a flowchart depicting operational steps of a program, on a server computer within the computational environment of FIG. 1 for self-supervised speech recognition through sparse subnetwork discovery within pre-trained speech self-supervised learning (SSL), in accordance with an embodiment of the present invention.

FIG. 2 depicts flowchart 200 illustrating operational steps of program 150 for self-supervised speech recognition through sparse subnetworks discovery within pre-trained speech SSL, in accordance with an embodiment of the present invention.

Program 150 receives a pre-trained self-supervised learning (SSL) model (step 202). In an embodiment, program 150 initiates responsive to a completed SSL or the detection/reception of a pre-trained SSL (i.e., model 152). In another embodiment, program 150 initiates responsive to a downstream task or a speech recognition request for a targeted language. In an embodiment, program 150 adopts a pre-trained speech SSL (e.g., wav2vec2 and xlsr) for the pre-trained initialization $\theta_0$.

Program 150 obtains an initial subnetwork at a target sparsity and an initial pruning mask from the received SSL model (step 204). Program 150 discovers one or more subnetworks, $f(x; m \odot \theta_0)$, by applying pruning mask in on $\theta_0$. In an embodiment, program 150 directly applies pruning with rewinding to $\theta_0$. In another embodiment, program 150 utilizes pruning methods based on Unstructured Magnitude Pruning (UMP), where weights of the lowest magnitudes are pruned out regardless of the network structure to satisfy a target sparsity level. For example, program 150 utilizes Random Pruning (RP), where weights in $\theta_0$ are randomly eliminated. In various embodiments, program 150 identifies a task-aware subnetwork by pruning with a target dataset, $D_l$, utilizing One-Shot Magnitude Pruning (OMP) and Iterative Magnitude Pruning (IMP). In this embodiment, OMP comprises finetuning pretrained weights $\theta_0$ on target dataset $D_l$ to get the finetuned weights $\theta^l$; and applying UMP on $\theta^l$ and retrieving a pruning mask m. In a further embodiment, program 150 segments subnetwork discovery into multiple iterations comprising ASR fine tunings, where each iteration is an OMP with a fraction of the target sparsity pruned. In a further embodiment, each iteration prunes out 10% of the remaining weights.

In an embodiment, program 150 applies any task-agnostic subnetwork discovery to obtain an initial subnetwork, comprising pruning without having seen $D_l$ nor l in advance. In an embodiment, program 150 applies UMP directly on $\theta_0$ without any downstream finetuning to retrieve m, referred to as Magnitude Pruning at Pre-trained Initializations (MPI). In another embodiment, program 150 prunes weights finetuned for a different language t, i.e., applying UMP on $\theta^t$ for the target language l; the present invention refers to this as cross-lingual mask transfer. In an embodiment, program 150 applies MPI on one or more pre-trained speech SSL models to generate one or more initial subnetworks. In another embodiment, applies OMP on a different spoken language to generate one or more initial subnetworks. The above embodiments allow the present invention to obtain the initial subnetwork without significant computational resources and without target task finetuning.

In an embodiment, program 150 identifies the initial subnetwork by starting at a lower sparsity, and progressively pruning up to the target sparsity s, referred to as PARP-P. In this embodiment, the intuition is that despite Observation 1, not any subnetwork can be a good initial subnetwork, such as those obtained from RP, or those obtained at very high sparsities in MPI/OMP/IMP. This embodiment demonstrates effectiveness at higher sparsity regions, (e.g., 90%) for LSR. PARP-P has the same computational cost as PARP, and the only difference is the initial starting sparsity.

Program 150 finetunes the initial subnetwork based on a target downstream task or language (step 206). In an embodiment, program 150 finetunes the obtained subnetwork, from step 204, to recover pruning loss (i.e., finetune $f(x; m \odot \theta_0)$ on $D_l$). In an embodiment, program 150 finetunes on downstream ASR tasks specified by a downstream loss $L_l(\theta)$, such as connectionist temporal classification (CTC), and evaluated on target dataset $D_l$. Program 150 initiates finetuning by zero-out masked-out weights in $\theta_{n1}$ specified by m. In this embodiments, instead of permanently removing the masked-out weights from the computation graph, program 150 merely zeroes said weights out. Here, the weights that are important for the downstream task (the "important weights") emerge with gradient updates; those that are relatively irrelevant decrease in magnitude, and, responsively, program 150 zeros said irrelevant weights out, whereby circumventing the need of straight-through estimation or additional sparsity loss. Responsively, program 150 trains the initial or previous subnetwork with a plurality of model updates, resulting in a new subnetwork. In an embodiment, program 150 applies UMP, as described in step 204, on the new subnetwork, while adjusting the associated pruning mask. The adjusted (i.e., finetuned) subnetwork is $f(x; m \odot \theta_0)$. In various embodiments, program 150 repeats step 206 until the total number of models update reach N, and responsively returns the finetuned subnetwork.

Program 150 deploys finetuned subnetwork (step 208). In an embodiment, program 150 integrates the subnetwork within a corresponding ASR model and responsively classifies an audio segment while transcribing said audio segment for the target language. In an embodiment, program 150 prunes for an unseen new language, and deploys the finetuned subnetwork, thus saving additional finetuning and memory costs.

Figure 3:
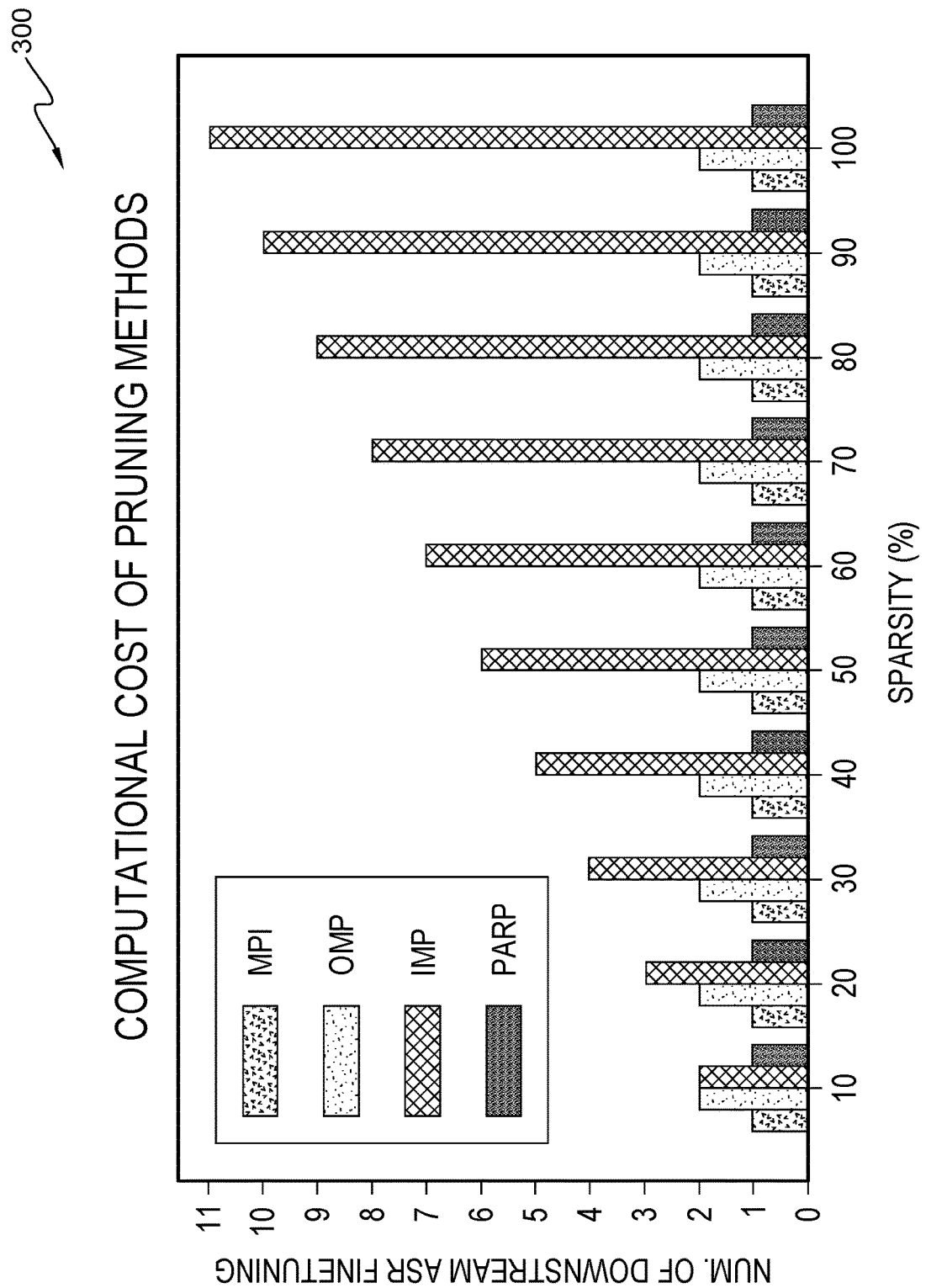
FIG. 3 is a bar graph depicting experimental results of the program, in accordance with an embodiment of the present invention.

FIG. 3 illustrates bar graph 300 depicting experimental results of the program, in accordance with an embodiment of the present invention. Bar graph 300 demonstrates the number of ASR finetuning iterations needed compared to target sparsities for each downstream task/language. Cross-referencing FIG. 6, FIG. 3 shows that as the number of downstream tasks increase, IMP requires exponentially more compute to match the performance of PARP.

FIG. 4 illustrates algorithm 400, in accordance with an embodiment of the present invention. Algorithm 400 demonstrates the steps described in FIG. 2.

FIGS. 5A and 5B illustrate matrices 500 depicting experimental results of the program, in accordance with an embodiment of the present invention. Matrices 500 demonstrate language pairs' OMP pruning mask IOUs on wav2vec2 and xlsr. Matrices 500 show the high overlaps across all pairs, but also the high IOUs with the MPI masks (second to last row of each matrix).

FIG. 6 illustrates graphs 600 depicting experimental results of the program, in accordance with an embodiment of the present invention. Graphs 600 demonstrates a comparison of different pruning techniques on LSR (wav2vec2 with 10 min/1 h/10 h Librispeech finetuning splits). PARP and PARP-P are especially effective under ultra-low data regime (e.g., 10 min) and high-sparsity (70-100%) regions. Graphs 600 show the WER under low-resource scenarios of the subnetworks identified by OMP and IMP at different sparsity levels. None of the sparsity levels achieves a visible drop in WER compared to the zero sparsity case, corresponding to the original dense network. FIG. 6 demonstrates that subnetworks discovered by PARP and PARP-P can achieve 60-80% sparsities with minimal degradation to the full models. The gap between PARP and other pruning methods also widens as sparsities increase FIG. 7 illustrates table 700 depicting experimental results of the program, in accordance with an embodiment of the present invention. FIG. 7 compares PARP and PARP-P with OMP and IMP at 90% sparsity, and PARP-P has a 40% absolute WER reduction.

FIG. 8 illustrates table 800 depicting experimental results of the program, in accordance with an embodiment of the present invention. Table 800 compares the subnetworks discovered by PARP with the full wav2vec2 and prior work on LSR under the same settings. Table 800 shows that the discovered subnetwork attained an absolute 10.9%/12.6% WER reduction over the full wav2vec2-large.

Figure 9:
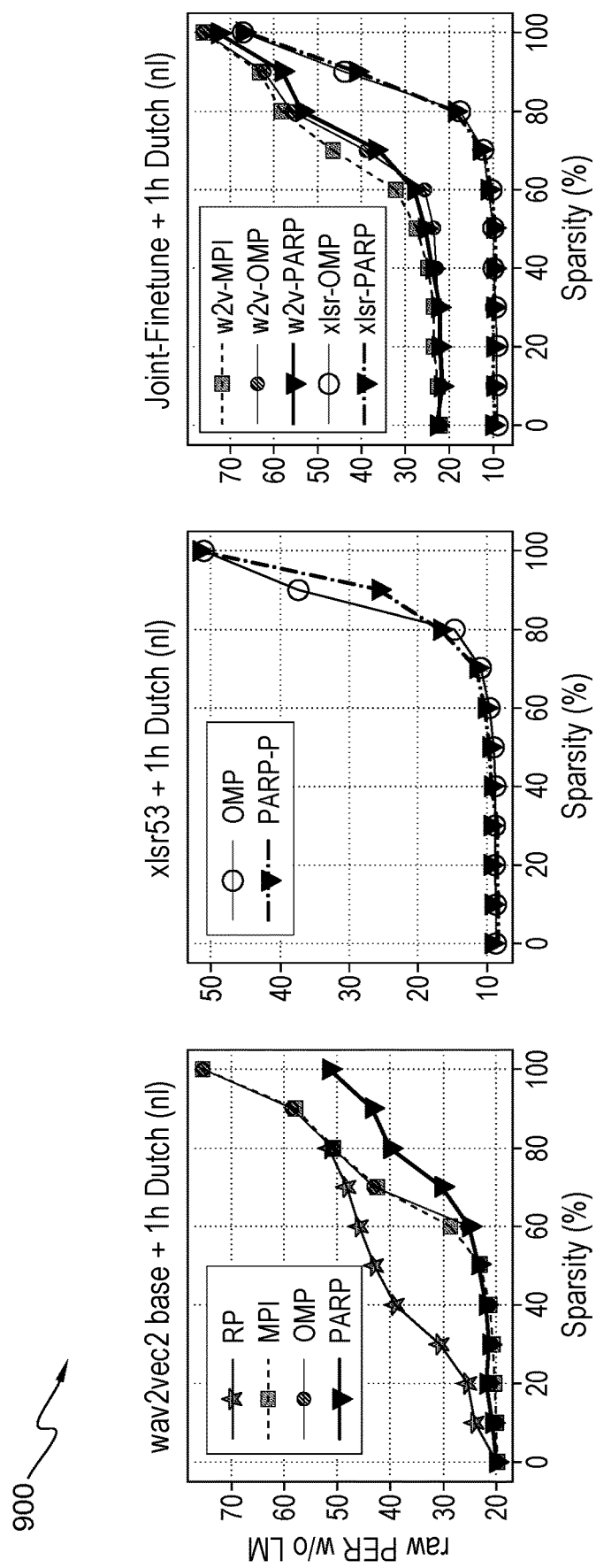
FIG. 9 is a set of graphs depicting experimental results of the program, in accordance with an embodiment of the present invention.

FIG. 9 illustrates graphs 900 depicting experimental results of the program, in accordance with an embodiment of the present invention. Graphs 900 show results from pruning H2L and CSR with 1 h of Dutch (nl) finetuning and demonstrates extension to other spoken languages. Graphs 900 show a comparison of pruning techniques on H2L & CSR with 1 h of Dutch (nl) ASR finetuning. (Left) Pruning H2L (wav2vec2-base+nl). (Center) Pruning CSR (xlsr+nl). (Right) Pruning jointly-finetuned wav2vec2-base and xlsr on nl. Trend is consistent for other 9 spoken languages. Graphs 900 demonstrate that PARP and OMP reach 50% sparsity on H2L and 70% sparsity on CSR with minimal degradations. Furthermore, while PARP is more effective than OMP on H2L for all sparsities, such advantage is only visible in the higher sparsity regions on CSR.

Figure 10:
FIG. 10 is a table depicting experimental results of the program, in accordance with an embodiment of the present invention.

FIG. 10 illustrates table 1000 depicting experimental results of the program, in accordance with an embodiment of the present invention. Table 1000 compares the subnetworks from H2L and CSR with prior work. Table 1000 demonstrates that even with as high as 90% sparsities in either settings, subnetworks from PARP or OMP out-perform prior art.

Figure 11:
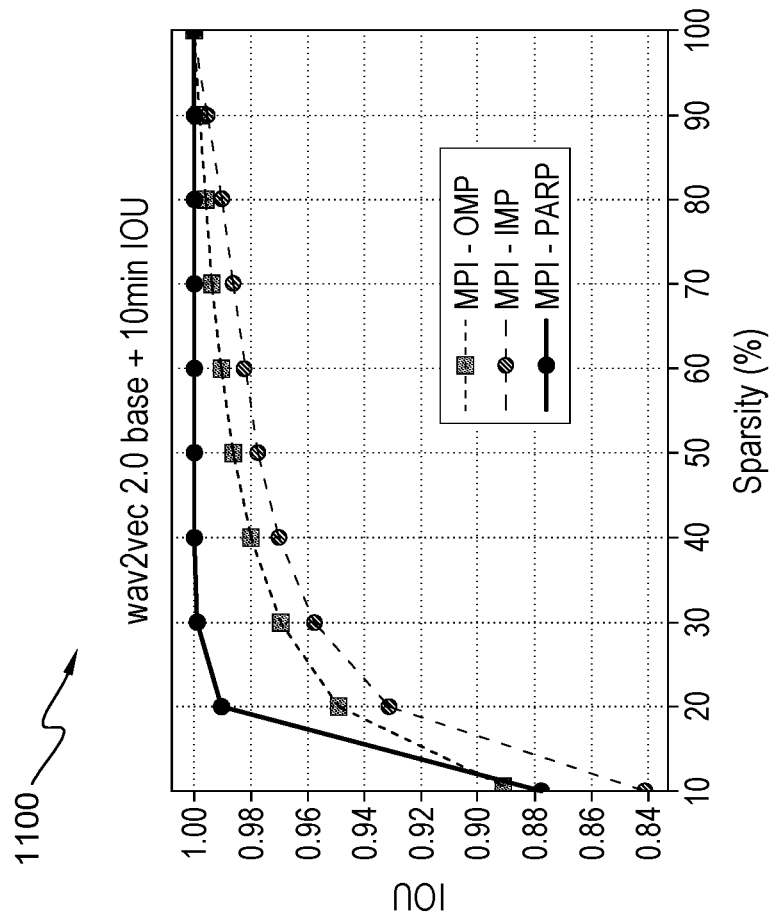
FIG. 11 is a graph depicting experimental results of the program, in accordance with an embodiment of the present invention.

FIG. 11 illustrates graph 1100 depicting experimental results of the program, in accordance with an embodiment of the present invention. Graph 1100 demonstrates a >99.99% IOU between the final "adjusted" subnetwork from PARP and its initial MPI subnetwork after 20% sparsity, confirming indeed only a minimal "adjustment" to the initial subnetwork. Graph 1100 shows PARP's final subnetwork and its initial MPI subnetwork exceeds 99.99% IOU after 20% sparsity.

Figure 12:
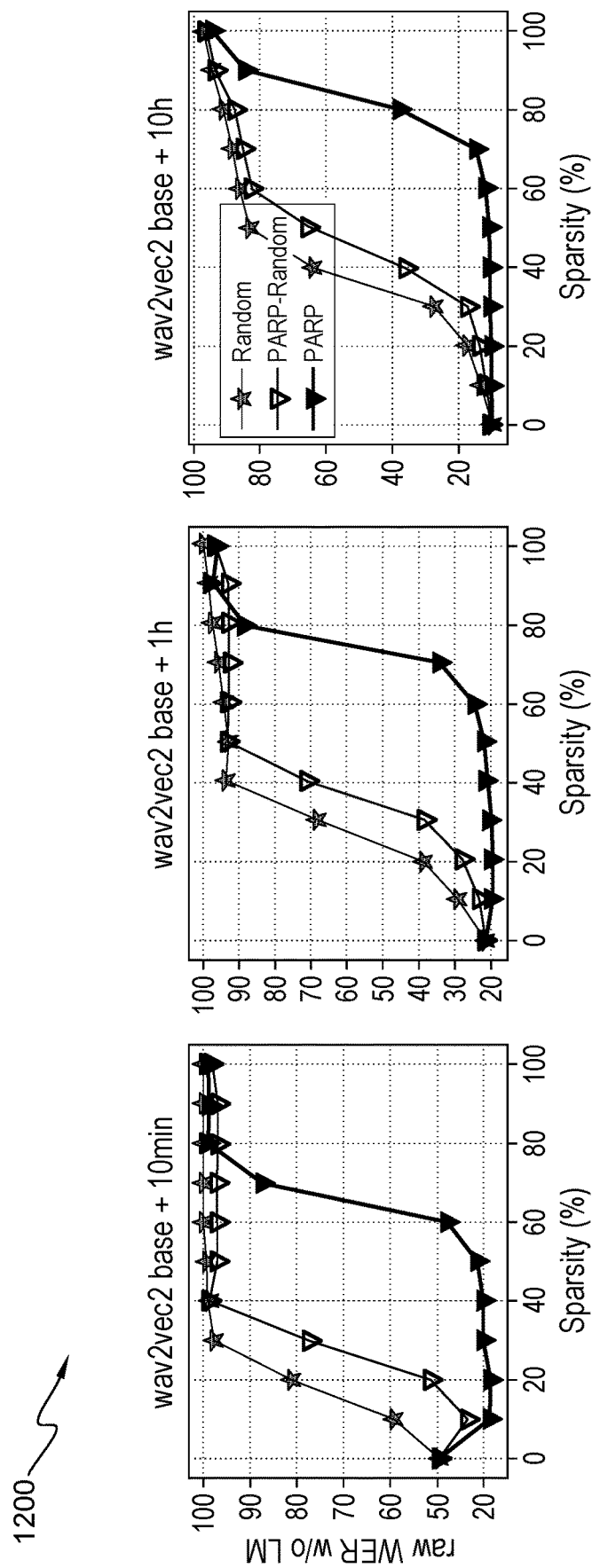
FIG. 12 is a set of graphs depicting experimental results of the program, in accordance with an embodiment of the present invention.

FIG. 12 illustrates graphs 1200 depicting experimental results of the program, in accordance with an embodiment of the present invention. Graphs 1200 demonstrates PARP with a random subnetwork from RP, instead of subnetwork from MPI, as the initial subnetwork. PARP with random initial subnetwork performs nearly as bad as RP, signifying the importance of the initial subnetwork.

FIGS. 13A and 13B illustrate matrices 1300 depicting experimental results of the program, in accordance with an embodiment of the present invention. Matrices 1300 shows the transferability results on H2L with pre-trained wav2vec2-base. FIG. 13A is a subnetwork at 50% sparsity transfer with regular finetuning that contains subtle language clusters—for example, when finetuning on Russian (ru), source masks from Spanish (es), French (fr), Italian (it), Kyrgyz (ky), Dutch (nl) induces a much higher PER compared to that from sv-SE, tr, tt, zh-TW. FIG. 13B shows that there is no cross-lingual PER degradation with PARP, supporting the claim above.

FIG. 14 illustrates table 1400 depicting experimental results of the program, in accordance with an embodiment of the present invention. Table 1400 compares PARP (averaged for each target task) to those reported in BERT-Ticket, hinting the applicability of PARP to other domains and pre-trained models. Table 1400 compares cross-task transfer on GLUE (subnetwork from source task A is finetuned for target task B). Numbers are averaged acc. across source tasks for each target task.

Figure 15:
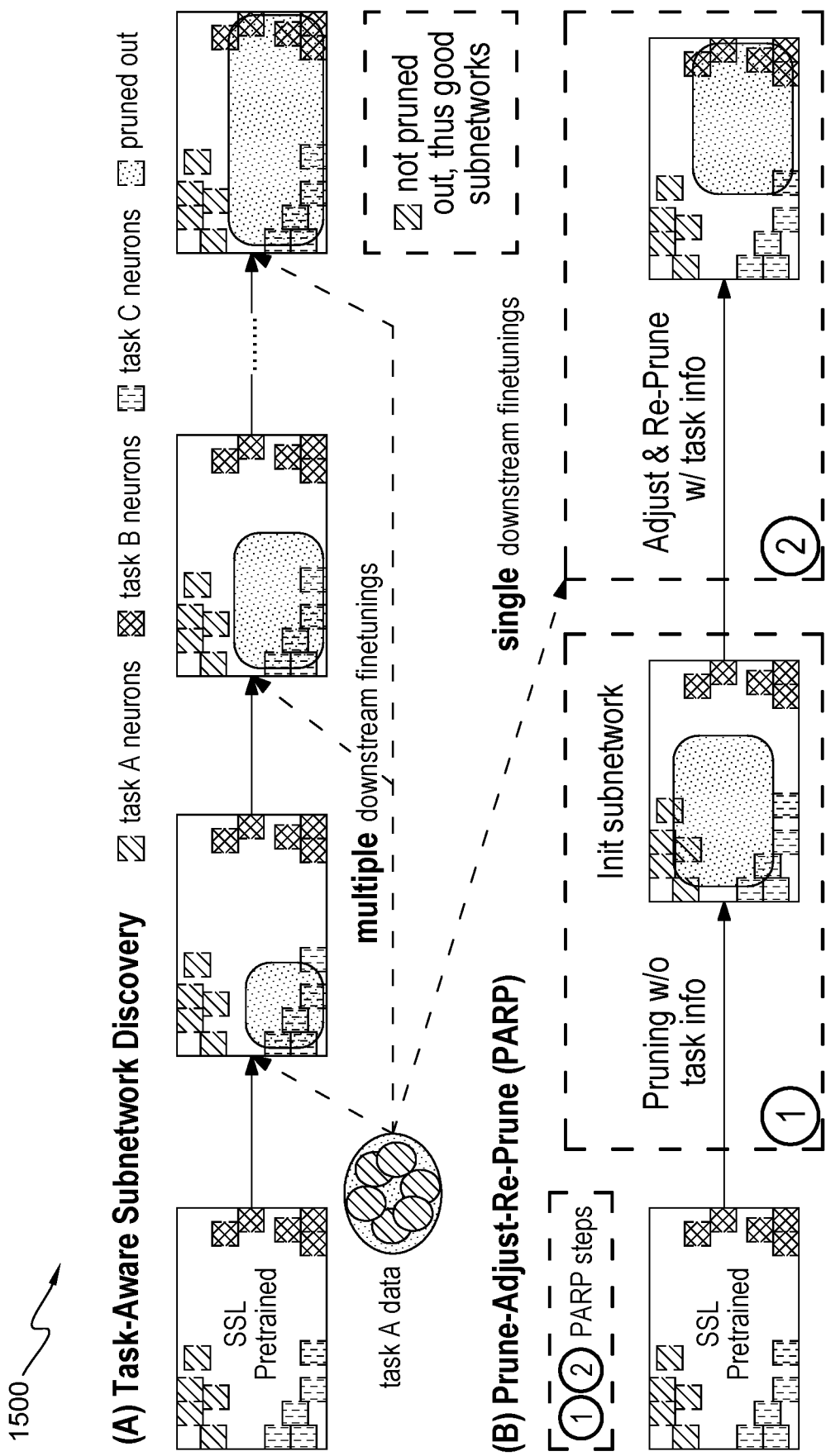
FIG. 15 is a flowchart depicting operational steps of the program, on a server computer within the computational environment of FIG. 1 for Prune-Adjust-Re-Prune (PARP), in accordance with an embodiment of the present invention.

FIG. 15 illustrates exemplary flowchart 1500 depicting operational steps of the program, on a server computer within the computational environment of FIG. 1 for Prune-Adjust-Re-Prune (PARP), in accordance with an embodiment of the present invention. Flowchart 1500 demonstrates a conceptual sketch of pruning the few task-specific important weights in pretrained SSL. (A) Task-aware subnetwork discovery (OMP/IMP) is more effective than task-agnostic pruning (MPI) since it foresees the important weights in advance, via multiple downstream fine tunings. (B) PARP starts with an initial subnetwork given by MPI. Flowchart 1500 suggests that the subnetwork is only off by the few important weights, and thus reviving them by adjusting the initial subnetwork.

Figure 16:
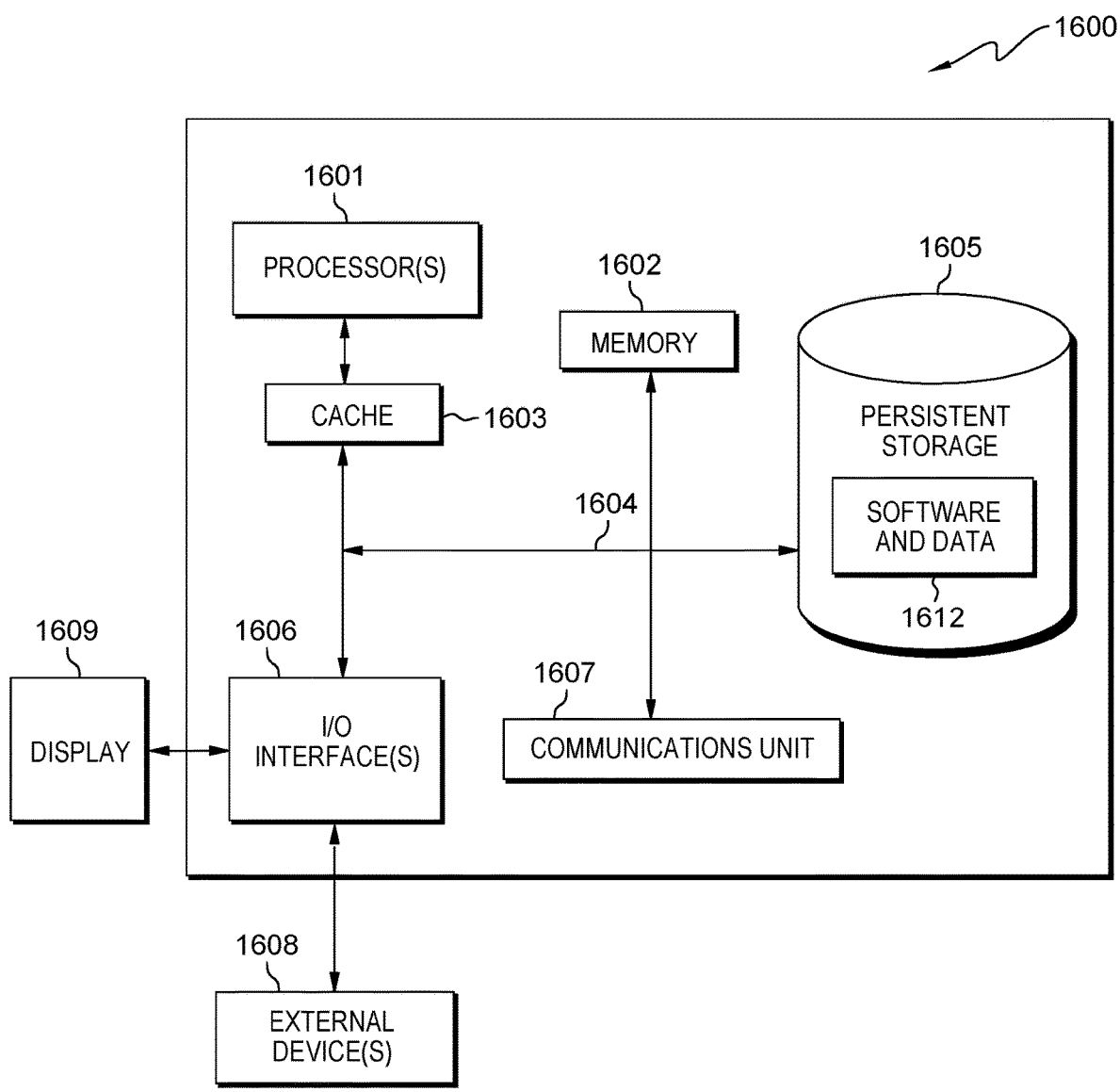
FIG. 16 is a block diagram of components of the server computer, in accordance with an embodiment of the present invention.

FIG. 16 depicts block diagram 1600 illustrating components of server computer 120 in accordance with an illustrative embodiment of the present invention. It should be appreciated that FIG. 16 provides only an illustration of one implementation and does not imply any limitations with regard to the environments in which different embodiments may be implemented. Many modifications to the depicted environment may be made.

Server computer 120 each include communications fabric 1604, which provides communications between cache 1603, memory 1602, persistent storage 1605, communications unit 1607, and input/output (I/O) interface(s) 1606. Communications fabric 1604 can be implemented with any architecture designed for passing data and/or control information between processors (such as microprocessors, communications, and network processors, etc.), system memory, peripheral devices, and any other hardware components within a system. For example, communications fabric 1604 can be implemented with one or more buses or a crossbar switch.

Memory 1602 and persistent storage 1605 are computer readable storage media. In this embodiment, memory 1602 includes random access memory (RAM). In general, memory 1602 can include any suitable volatile or non-volatile computer readable storage media. Cache 1603 is a fast memory that enhances the performance of computer processor(s) 1601 by holding recently accessed data, and data near accessed data, from memory 1602.

Program 150 may be stored in persistent storage 1605 and in memory 1602 for execution by one or more of the respective computer processor(s) 1601 via cache 1603. In an embodiment, persistent storage 1605 includes a magnetic hard disk drive. Alternatively, or in addition to a magnetic hard disk drive, persistent storage 1605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1605 may also be removable. For example, a removable hard drive may be used for persistent storage 1605. Other examples include optical and magnetic disks, thumb drives, and smart cards that are inserted into a drive for transfer onto another computer readable storage medium that is also part of persistent storage 1605. Software and data 1612 can be stored in persistent storage 1605 for access and/or execution by one or more of the respective processors 1601 via cache 1603.

Communications unit 1607, in these examples, provides for communications with other data processing systems or devices. In these examples, communications unit 1607 includes one or more network interface cards. Communications unit 1607 may provide communications through the use of either or both physical and wireless communications links. Program 150 may be downloaded to persistent storage 1605 through communications unit 1607.

I/O interface(s) 1606 allows for input and output of data with other devices that may be connected to server computer 120. For example, I/O interface(s) 1606 may provide a connection to external device(s) 1608, such as a keyboard, a keypad, a touch screen, and/or some other suitable input device. External devices 1608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 1605 via I/O interface(s) 1606. I/O interface(s) 1606 also connect to a display 1609.

Display 1609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Further Comments and/or Embodiments

Abstract

Recent work on speech self-supervised learning (speech SSL) demonstrated the benefits of scale in learning rich and transferable representations for Automatic Speech Recognition (ASR) with limited parallel data. It is then natural to investigate the existence of sparse and transferrable subnetworks in pre-trained speech SSL models that can achieve even better low-resource ASR performance. However, directly applying widely adopted pruning methods such as the Lottery Ticket Hypothesis (LTH) is suboptimal in the computational cost needed. Moreover, contrary to what LTH predicts, the discovered subnetworks yield minimal performance gain compared to the original dense network. In this work, the present invention proposes Prune-Adjust-Re-Prune (PARP) to discover and finetune subnetworks for much better ASR performance, while only requiring a single downstream finetuning run. PARP is inspired by pruned subnetworks for pre-training tasks only needed to be slightly adjusted to achieve a sizeable performance boost in downstream ASR tasks. The present invention shows that on low-resource English and multilingual ASR sparse subnetworks exist in pre-trained speech SSL, and (2) the computational advantage and performance gain of PARP over baseline pruning methods. On the 10 min Librispeech (i.e., large-scale (1000 hours) corpus of read English speech) split without LM decoding, PARP discovers subnetworks from wav2vec 2.0 with an absolute 10.9%/12.6% WER decrease compared to the full model. The present invention demonstrates that PARP mitigates performance degradation in cross-lingual mask transfer, and the possibility of discovering a single subnetwork for 10 spoken languages in one run.

1 Introduction

For many low-resource spoken languages in the world, collecting large-scale transcribed corpora is very costly and sometimes infeasible. Inspired by efforts such as the IARPA BABEL program, Automatic Speech Recognition (ASR) trained without sufficient transcribed speech data has been a critical yet challenging research agenda in speech processing. Recently, Self-Supervised Speech Representation Learning (speech SSL) has emerged as a promising pathway toward solving low-resource ASR. Speech SSL involves pre-training a speech representation module on large-scale unlabeled data with a self-supervised learning objective, followed by finetuning on a small number of supervised transcriptions. Many recent studies have demonstrated the empirical successes of speech SSL on low-resource English and multi-lingual ASR, matching systems trained on fully-supervised. Prior research attempts, however, focus on pre-training objectives, scaling up speech representation modules, or pre-training data selections. The present invention develops an orthogonal approach that is complementary to these existing speech SSL studies, that achieves 1) lower architectural complexity and 2) higher performance (lower WER) under the same low-resource ASR settings.

Neural network pruning, as well as the more recently proposed Lottery Ticket Hypothesis (LTH), provides a potential solution that accomplishes both objectives. According to LTH, there exists sparse subnetworks that can achieve the same or even better accuracy than the original dense network. Such phenomena have been successfully observed in various domains: Natural Language Processing (NLP), Computer Vision (CV), and many others. All finding sparse subnetworks with comparable or better performance than the dense network. Given the lack of similar studies on pruning self-supervised ASR, the present invention fills this gap by finding sparse subnetworks within a pre-trained speech SSL that can achieve superior performance to the full pre-trained model on downstream ASR tasks.

However, directly applying widely-adopted pruning methods, such as One-Shot Magnitude Pruning (OMP) and Iterative Magnitude Pruning (IMP), to pre-trained speech SSL suffers from two challenges. First, adopting these methods in the conventional pruning framework is extremely time-consuming for SOTA speech SSL models. OMP and IMP involve more than one round of finetuning on downstream tasks (i.e., FIG. 3), and finetuning for ASR is time consuming and computationally demanding. The second challenge is that there is no performance improvement of the subnetworks over the original dense network with OMP or IMP. FIG. 6 shows the WER under low-resource scenarios of the subnetworks identified by OMP (purple line) and IMP (blue dashed line) at different sparsity levels. None of the sparsity levels achieves a visible drop in WER compared to the zero sparsity case, corresponding to the original dense network.

The present invention is a magnitude-based unstructured pruning method, termed Prune-Adjust-Re-Prune (PARP), for discovering sparse subnetworks within pre-trained speech SSL. PARP consists of the following two steps: 1. The present invention directly prunes the SSL pre-trained model at target sparsity and obtains an initial subnetwork and an initial pruning mask. 2. The present invention finetunes the initial subnetwork on target downstream task/language. During finetuning, the present invention zeros out the pruned weights specified by the pruning mask but allows the weights to be updated by gradient descent during backpropagation. Responsive to a plurality of model updates, the prevent invention re-prunes the updated subnetwork at target sparsity again.

In Step 1, the present invention provides an initial subnetwork that is agnostic to the downstream task, and in Step 2, the present invention makes learnable adjustments by reviving pruned out weights. A formal and generalized description and its extension are introduced in Section 3. Different from pruning methods in, PARP allows pruned-out weights to be revived during finetuning and Step 2 only makes minimal adjustment to the initial subnetwork and obtaining a good initial subnetwork in Step 1 is the key. The present invention empirically shows in Section 3 that any task-agnostic subnetwork surprisingly provides a good basis for Step 2, suggesting that the initial subnetwork can be cheaply obtained either from a readily available task/language or directly pruning the pre-trained SSL model itself. In addition, the present invention performs cross-lingual mask transfer experiments, where the initial subnetwork is obtained via a different language other than the target language.

The present invention demonstrates extensive PARP and baseline (OMP and IMP) pruning experiments on low-resource ASR with mono-lingual (pre-trained wav2vec 2.0) and cross-lingual (pre-trained XLSR-53) transfer. PARP finds significantly superior speech SSL subnetworks for low-resource ASR, while only requiring a single pass of downstream finetuning. Due to its simplicity, PARP adds minimal computation overhead to existing SSL downstream finetuning.

The present invention shows that sparse subnetworks exist in pre-trained speech SSL. In addition, PARP achieves superior results to OMP and IMP across all sparsities, amount of finetuning supervision, pretrained model scale, and downstream spoken languages. On Librispeech 10 min without LM decoding/self-training, PARP discovers subnetworks from wav2vec 2.0 with an absolute 10.9%/12.6% WER decrease compared to the full model, without modifying the finetuning hyper-parameters or objective (Section 4.1). Ablation studies on demonstrating the importance of PARP's initial subnetwork (Section 4.2). PARP achieves minimal performance drop in cross-lingual mask transfer, where a subnetwork pruned for ASR in one spoken language is adapted to another language (Section 4.3). PARP can also discover a single subnetwork for 10 spoken languages in a single pass (Section 4.4). Last but not least, the prevent invention demonstrates PARP's effectiveness on pre-trained BERT, mitigating the cross-task performance degradation (Section 4.5).

The findings of the present invention not only complement and advance current and future speech SSL for low-resource ASR, but also provide new insights for the rich body of pruning work.

2 Preliminaries 2.1 Problem Formulation

Consider the low-resource ASR problem, where there is only a small, transcribed training set $(x,y) \in D_l$. Here x represents input audio and y represents output transcription. Subscript $l \in \{1, 2, \ldots\}$ represents the downstream spoken language identity. Because of the small dataset size, empirical risk minimization generally does not yield good results. Speech SSL instead assumes there is a much larger unannotated dataset $x \in D_0$. SSL pre-trains a neural network $f(x; \theta)$, where $\theta \in \mathbb{R}^d$ represents the network parameters and d represents the number of parameters, on some self-supervised objective, and obtains the pre-trained weights $\theta_0$. $f(x; \theta_0)$ is then finetuned on downstream ASR tasks specified by a downstream loss $L_l(\theta)$, such as CTC, and evaluated on target dataset $D_l$.

The goal of the present invention is to discover a subnetwork that minimizes downstream ASR WER on $D_l$. Formally, denote $m \in \{0, 1\}d$, as a binary pruning mask for the pre-trained weights $\theta_0$, and $\theta'$ as the finetuned weights on $D_l$. The ideal pruning method should learn (m, $\theta'$), such that the subnetwork $f(x; m \odot \theta')$ (where $\odot$ is element-wise product) achieves minimal finetuning $L_l(\theta)$ loss on $D_l$.

2.2 Pruning Targets and Settings

The present invention adopts pre-trained speech SSL wav2vec2 and xlsr for the pre-trained initialization $\theta_0$.

wav2vec 2.0: The present invention takes wav2vec 2.0 base (wav2vec2-base) and large (wav2vec2-large) pre-trained on Librispeech 960 hours. During finetuning, a task specific linear layer is added by the present invention on top of wav2vec2 and jointly finetuned with CTC loss.

xlsr-53 (xlsr) shares the same architecture, pre-training and finetuning objectives as wav2vec2-large. xlsr is pre-trained on 53 languages sampled from CommonVoice, BABEL, and Multilingual LibriSpeech, totaling for 56 k hours of multi-lingual speech data.

The present invention considers three settings where wav2vec2 and xlsr are used as the basis for low-resource ASR:

LSR: Low-Resource English ASR. Mono-lingual pre-training and finetuning—an English pretrained speech SSL such as wav2vec2 is finetuned for low-resource English ASR.

H2L: High-to-Low Resource Transfer for Multi-lingual ASR. Mono-lingual pre-training and multi-lingual fine-tuning—a speech SSL pre-trained on a high-resource language such as English is finetuned for low-resource multi-lingual ASR.

CSR: Cross-lingual Transfer for Multi-lingual ASR. Multi-lingual pre-training and finetuning—a cross-lingual pretrained speech SSL such as xlsr is finetuned for low-resource multi-lingual ASR.

2.3 Subnetwork Discovery in Pre-Trained SSL

The present invention provides a solution to the aforementioned problem in Section 2.1 is to directly apply pruning with rewinding to $\theta_0$, which has been successfully applied to pre-trained BERT and SimCLR. All pruning methods, including the present invention, are based on Unstructured Magnitude Pruning (UMP), where weights of the lowest magnitudes are pruned out regardless of the network structure to meet the target sparsity level. The present invention introduces four pruning baselines below, and provides results with Random Pruning (RP), where weights in $\theta_0$ are randomly eliminated.

Task-Aware Subnetwork Discovery comprises pruning with target dataset $D_l$ seen in advance, including One-Shot Magnitude Pruning (OMP) and Iterative Magnitude Pruning (IMP). OMP is summarized as: 1. Finetune pretrained weights $\theta_0$ on target dataset $D_l$ to get the finetuned weights $\theta^l$. 2. Apply UMP on $\theta^l$ and retrieve pruning mask m.

IMP breaks down the above subnetwork discovery phase into multiple iterations comprising downstream ASR fine tunings. Each iteration itself is an OMP with a fraction of the target sparsity pruned. The present invention follows the IMP implementation described in BERT-Ticket, where each iteration prunes out 10% of the remaining weights. The main bottleneck for OMP and IMP is the computational cost since multiple rounds of fine tunings are required for subnetwork discovery.

Task-Agnostic Subnetwork Discovery refers to pruning without having seen $D_l$ nor l in advance. One instance is applying UMP directly on $\theta_0$ without any downstream finetuning to retrieve m, referred to as Magnitude Pruning at Pre-trained Initializations (MPI). Another case is pruning weights finetuned for a different language t, i.e., applying UMP on $\theta^t$ for the target language l; the present invention refers to this as cross-lingual mask transfer. While these approaches do not require target task finetuning, the discovered subnetworks generally have worse performance than those from OMP or IMP.

The above methods are only for subnetwork discovery via applying pruning mask m on $\theta_0$. The discovered subnetwork $f(x; m \odot \theta_0)$ needs another downstream finetuning to recover the pruning loss, i.e., finetune $f(x; m \odot \theta_0)$ on $D_l$.

In this section, the present invention, PARP, is highlighted (Section 3.1), its underlying intuition (Section 3.2), and an extension termed PARP-P (Section 3.3).

3.1 Algorithm

The present invention formally describes PARP with the notations from Section 2. A visual overview of PARP is FIG. 15.

Empirically, the present invention found the choice of n has little impact. In contrast to OMP/IMP/MPI, PARP allows the pruned-out weights to take gradient descent updates. A side benefit of PARP is it jointly discovers and finetunes subnetwork in a single pass, instead of two or more in OMP and IMP.

3.2 Obtaining and Adjusting the Initial Subnetwork

PARP achieves superior or comparable pruning results as task-aware subnetwork discovery, while inducing similar computational cost as task-agnostic subnetwork discovery. The key is the discovered subnetworks from task-aware and task-agnostic pruning have high, non-trivial overlaps in LSR, H2L, and CSR. The present invention first defines Intersection over Union (IOU) for quantifying subnetworks' (represented by their pruning masks $m^a$ and $m^b$) similarity:

$$IOU(m^a, m^b) \triangleq \frac{|(m^a = 1) \cap (m^b = 1)|}{|(m^a = 1) \cup (m^b = 1)|} \quad 1)$$

Take H2L and CSR for instance, FIGS. 5A and 5B visualize language pairs' OMP pruning mask IOUs on wav2vec2 and xlsr. The present invention observes the high overlaps across all pairs, but also the high IOUs with the MPI masks (second to last row). The present invention generalizes these observations to the following: Observation 1: For any sparsity, any amount of finetuning supervision, any pre-training model scale, and any downstream spoken languages, the non-zero ASR pruning masks obtained from task-agnostic subnetwork discovery has high IOUs with those obtained from task-aware subnetwork discovery. Observation 1 suggests that any task-agnostic subnetwork could sufficiently be a good initial subnetwork in PARP due to the high similarities. In the same instance for H2L and CSR, the present invention could either take MPI on wav2vec2 and xlsr or utilize OMP on a different spoken language as the initial subnetworks. Similarly, in LSR, the present invention utilizes MPI on wav2vec2 as the initial subnetwork. The underlying message is that the initial subnetwork is obtained cheaply, without target task finetuning.

The present invention slightly adjusts the initial subnetwork (represented by its pruning mask $m_o$) needed merely a slight adjustment for the target downstream task due to the aforementioned high similarity. While there are techniques such as dynamic mask adjustment, important weights pruning, and deep rewiring, the present invention provides an even simpler alternative suited for the setting. Instead of permanently removing the masked-out weights from the computation graph, PARP merely zeroes them out. Weights that are important for the downstream task (the "important weights") should emerge with gradient updates; those that are relatively irrelevant should decrease in magnitude, and thus be zero-outed at the end. Doing so circumvents the need of straight-through estimation or additional sparsity loss.

3.3 PARP-Progressive

An extension to PARP is PARP-P, where the second P stands for Progressive. In PARP-P, the initial subnetwork starts at a lower sparsity, and progressively prune up to the target sparsity s in Step 2. The intuition is that despite Observation 1, not any subnetwork can be a good initial subnetwork, such as those obtained from RP, or those obtained at very high sparsities in MPI/OMP/IMP. The present invention demonstrates that PARP-P is especially effective in higher sparsity regions, e.g., 90% for LSR. Note that PARP-P has the same computational cost as PARP, and the only difference is the initial starting sparsity in Step 1.

4 Experiments and Analysis

4.1 Comparing PARP, OMP, and IMP on LSR, H2L, and CSR

The present invention first demonstrates the existence of sparse subnetworks in speech SSL. FIG. 6 shows the pruning results on LSR. The present invention demonstrates that subnetworks discovered by PARP and PARP-P can achieve 60~80% sparsities with minimal degradation to the full models. The gap between PARP and other pruning methods also widens as sparsities increase. For instance, FIG. 7 compares PARP and PARP-P with OMP and IMP at 90% sparsity, and PARP-P has a 40% absolute WER reduction. In addition, the present invention demonstrates the WER reduction with PARP in the low sparsity regions on the 10 min split in FIG. 6. The same effect is not seen with OMP, IMP, nor MPI. FIG. 8 compares the subnetworks discovered by PARP with the full wav2vec2 and prior work on LSR under the same settings. The present invention shows that the discovered subnetwork attained an absolute 10.9%/12.6% WER reduction over the full wav2vec2-large. The present invention demonstrates that the performance gains are attributed to pruning out generic, unnecessary weights while preserving important weights, which facilitates training convergence. The present invention also presents the effectiveness of IMP with different rewinding starting points and found rewinding initializations bear minimal effect on downstream ASR.

Next, the present invention presents the pruning results of LSR transfers to H2L and CSR. FIG. 9 is pruning H2L and CSR with 1 h of Dutch (nl) finetuning, and the same conclusion can be extended to other spoken languages. Comparing FIGS. 6 and 9, the present invention demonstrates that shapes of the pruning curves are different, which can be attributed to the effect of character versus phone predictions. Comparing left and center of FIG. 9, the present invention demonstrates that PARP and OMP reach 50% sparsity on H2L and 70% sparsity on CSR with minimal degradations. Furthermore, while PARP is more effective than OMP on H2L for all sparsities, such advantage is only visible in the higher sparsity regions on CSR. Lastly, FIG. 10 compares the subnetworks from H2L and CSR with prior work. Even with as high as 90% sparsities in either settings, subnetworks from PARP or OMP out-perform prior art.

4.2 How Important is the Initial Subnetwork (Step 1) in PARP?

Obtaining a good initial subnetwork (Step 1) is critical for PARP, as Adjust & Re-Prune (Step 2) is operated on top of it. In this section, the present invention isolates the effect of Step 1 from Step 2 and examine the role of the initial subnetwork in PARP. FIG. 12 shows PARP with a random subnetwork from RP, instead of subnetwork from MPI, as the initial subnetwork. PARP with random initial subnetwork performs nearly as bad as RP (grey line), signifying the importance of the initial subnetwork.

Secondly, despite Observation 1, MPI in high sparsity regions (e.g., 90% in LSR) is not a good initial subnetwork, since the majority of the weights are already pruned out (thus is hard to be recovered from). From FIG. 6, PARP performs only on par or even worse than IMP in high sparsity regions. In contrast, PARP-P starts with a relatively lower sparsity (e.g., 60% or 70% MPI), and progressively prunes up to the target sparsity. Doing so yields considerable performance gain (up to over 50% absolute WER reduction). Third, as shown in FIG. 11, there is >99.99% IOU between the final "adjusted" subnetwork from PARP and its initial MPI subnetwork after 20% sparsity, confirming Step 2 indeed only made minimal "adjustment" to the initial subnetwork.

4.3 Are Pruning Mask Transferrable Across Spoken Language?

More concretely, the present invention investigates the transferability of OMP pruning mask discovered from a source language by finetuning its subnetwork on another target language. The present invention demonstrates insights on the underlying influence of spoken language structure on network pruning—that similar language pairs are transferrable. From a practical perspective, in an embodiment, the present invention prunes for an unseen new language in H2L, and the present invention deploys the readily available discovered subnetworks and thus save the additional finetuning and memory costs.

In this case, the initial subnetwork of PARP is given by applying OMP on another spoken language. According to Observation 1, PARP's Step 2 is effectively under-going cross-lingual subnetwork adaptation for the target language. FIGS. 13A and 13B show the transferability results on H2L with pre-trained wav2vec2-base. FIG. 13A is a subnetwork at 50% sparsity transfer with regular finetuning that contains subtle language clusters—for example, when finetuning on Russian (ru), source masks from Spanish (es), French (fr), Italian (it), Kyrgyz (ky), Dutch (nl) induces a much higher PER compared to that from sv-SE, tr, tt, zh-TW. FIG. 13B, the present invention shows that there is no cross-lingual PER degradation with PARP, supporting our claim above.

4.4 Discovering a Single Subnetwork for 10 Spoken Languages?

A major downside of pruning pre-trained SSL models for many downstream tasks is the exponential computational and memory costs. In H2L and CSR, the same pruning method needs to be repeatedly re-run for each downstream spoken language at each given sparsity. Therefore, the present invention shows the possibility of obtaining a single shared subnetwork for all downstream languages. Instead of finetuning separately for each language, the present invention constructs a joint phoneme dictionary and finetunes wav2vec2 and xlsr on all 10 languages jointly in H2L and CSR. Note that PARP with joint-finetuning may retrieve a shared subnetwork in a single run. The shared subnetwork then is decoded for each language separately. The right side of FIG. 9 illustrates the results.

Comparing joint-finetuning and individual-finetuning, in H2L, the present invention demonstrates that the shared subnetwork obtained via OMP has lower PERs between 60~80% but slightly higher PERs in other sparsity regions; in CSR, the shared subnetwork from OMP has slightly worse PERs at all sparsities. Comparing PARP to OMP in joint-finetuning, the present invention shows that while PARP is effective in the individual-finetuning setting (left of FIG. 9), its shared subnetworks are only slightly better than OMP in both H2L and CSR (right of FIG. 9). The smaller performance gain of PARP over OMP in pruning jointly-finetuned models is expected, since the important weights for each language are disjoint and joint-finetuning may send mixed signal to the adjustment step in PARP (see FIG. 8).

4.5 Does PARP Work on Pre-Trained BERT?

The present invention also analyzed whether Observation 1 holds for pre-trained BERT on 9 GLUE tasks. The present invention demonstrates found that there are also high (>98%) overlaps between the 9 tasks' IMP pruning masks. Given this observation, the present invention replicated the cross-task subnetwork transfer experiment (take subnetwork found by IMP at task A and finetune it for task B) in BERT-Ticket with PARP. FIG. 14 compares PARP (averaged for each target task) to those reported in BERT-Ticket, hinting the applicability of PARP to other domains and pre-trained models.

4.6 Implications

Observation 1 is consistent with the findings of probing large pre-trained NLP models such as BERT, that pre-trained SSL models are over-parametrized and there exist task-oriented weights/neurons. FIGS. 5A and 5B imply that these important weights only account for a small part of the pre-trained speech SSL. In fact, a large body of NLP work is dedicated to studying task-oriented weights in pre-trained models. Based on Observation 1, the present invention projects that these NLP results should in general transfer to speech. However, different from them, PARP leverages important weights for UMP on the whole network structure instead of just the contextualized representations.

The present invention further shows that a good pruning algorithm avoids pruning out task-specific neurons in pre-trained SSL, see FIG. 15. This not only offers an explanation on why PARP is effective in high sparsity regions and cross-lingual mask transfer, it also suggests that an iterative method such as IMP is superior to OMP because IMP gradually avoids pruning out important weights in several iterations, at the cost of more computational requirements. Finally, the present invention overcomes prior work that showed RP prevail under a certain threshold and setting, task-specific neurons are less likely to get "accidentally" pruned and thus accuracy is preserved even with RP.

5 Related Work

MODERN ASR PARADIGM AND ASR PRUNING. As model scale and model pre-training have become the two essential ingredients for obtaining SOTA performance in ASR and other speech tasks, applying and developing various forms of memory-efficient algorithms, such as network pruning, to these largescale pre-trained models will predictably soon become an indispensable research endeavor. Early work on ASR pruning can be dated back to pruning decoding search spaces and HMM state space. The present invention is the first on pruning large self-supervised pre-trained models for low-resource and multi-lingual ASR. In addition, none of the prior speech pruning work demonstrated the pruned models attain superior performance than its original counterpart.

6 Conclusion and Broader Impact

The present invention introduces PARP, a conceptually simple and intuitive pruning method for self-supervised speech recognition. The present invention demonstrates extensive experiments on pruning pre-trained wav2vec 2.0 and XLSR-53 under three low-resource settings, demonstrating (1) PARP discovers better subnetworks than baseline pruning methods while requiring a fraction of their computational cost, (2) the discovered subnetworks yields over 10% WER reduction over the full model, (3) PARP induces minimal cross lingual subnetwork adaptation errors, and (4) PARP discovers a shared subnetwork for multiple spoken languages in one pass. The broader impact of this invention lies in two orthogonal dimensions: (i) extending modern-day speech technology to many under-explored low-resource spoken languages, and (ii) introducing a new and flexible pruning technique to current and future speech SSL frameworks that reduces the computational costs required for adapting (finetuning) them to custom settings.

A. Model Details

Model configurations for wav2vec2-base, wav2vec2-large, and xlsr can be found in Section A.1. Finetuning hyper-parameters are detailed in Section A.2. PARP's hyper-parameter is detailed in Section A.3. More details on system implementations in Section A.4.

A.1 Model Configurations

In an embodiment, wav2vec 2.0 consists of three modules: a 7-layer CNN feature encoder for pre-processing raw speech waveforms, a quantization layer for discretizing, and a BERT for learning contextualized representations. In a further embodiment, the feature encoder is fixed, and the quantization layer is discarded during finetuning, the present invention focuses on pruning the BERT module in wav2vec 2.0 and XLSR-53. In an embodiment, the present invention does not prune the positional embedding layer, nor the layer normalization layers within BERT. wav2vec 2.0 BASE (wav2vec2-base) is based on BERT-BASE, which has 12 transformer blocks, hidden dimension 768, 12 self-attention heads, and 95M parameters. wav2vec 2.0 LARGE (denote as wav2vec2-large) is based on BERT-LARGE, which has 24 transformer blocks, hidden dimension 768, 16 self-attention heads, and 315M parameters. XLSR-53 (denoted as xlsr) shares the same architecture as wav2vec2-large. The present invention utilizes wav2vec2-base and wav2vec2-large that were pre-trained on Librispeech 960 h. wav2vec2-base, wav2vec2-large, and xlsr are pre-trained with the contrastive predictive coding objective.

A.2 Finetuning Hyper-Parameters

In an embodiment, wav2vec2 is finetuned for 20 k steps on the 10 h split, 15 k steps on the 1 h split, and 12 k steps on the 10 min split. xlsr is finetuned for 12 k steps for each spoken languages. In an embodiment, the final linear layer is frozen for 10 k steps, however, the present invention shows that doing so on the pruned models may lead to training instability. The learning rate ramps up linearly for first 10% of the steps, remains the same for 40% of the steps, and decay exponentially for 50% of the steps. The waveform encoder output is randomly masked. For LSR, the validation set is the dev-other subset from Librispeech.

A.3 PARP Hyper-Parameters

PARP introduces an additional pruning frequency hyper-parameter, n in FIG. 4. In an embodiment, as long as n is a sensible small number (e.g., 5-50 out of 10 k+ steps), the final pruned models have similar performance. In an embodiment, the present invention heuristically sets n=5 for pruning xlsr on all spoken language splits; the present invention sets n=50 for wav2vec2-base on 10 min/1 h, n=5 for wav2vec2-base on 10 h, n=5 for vec2-large on 10 min, n=2 for wav2vec2-large on 1 h, and n=1 for wav2vec2-large.

What is claimed is:

1. A computer-implemented method comprising:
    obtaining, by one or more computer processors, an initial subnetwork at a target sparsity and an initial pruning mask from a pre-trained self-supervised learning (SSL) speech model;
    finetuning, by one or more computer processors, the initial subnetwork, comprising:
        zeroing out, by one or more computer processors, one or more masked weights in the initial subnetwork specified by the initial pruning mask;
        training, by one or more computer processors, a new subnetwork from the zeroed out subnetwork;
        pruning, by one or more computer processors, one or more weights of lowest magnitude in the new subnetwork regardless of network structure to satisfy the target sparsity; and
    classifying, by one or more computer processors, an audio segment with the finetuned subnetwork.

2. The computer-implemented method of claim 1, wherein obtaining the initial subnetwork at the target sparsity and the initial pruning mask from a pre-trained SSL speech model, comprises:
    applying, by one or more computer processors, task-agnostic subnetwork discovery on the pre-trained SSL speech model.

3. The computer-implemented method of claim 2, wherein the task-agnostic subnetwork discovery, comprises:
    applying, by one or more computer processors, magnitude pruning at pre-trained initializations to the pre-trained SSL speech model.

4. The computer-implemented method of claim 1, wherein finetuning the initial subnetwork, further comprises:
    finetuning, by one or more computer processors, on downstream automatic speech recognition tasks specified by a downstream loss.

5. The computer-implemented method of claim 1, wherein the downstream loss is a connectionist temporal classification evaluated on a target dataset.

6. The computer-implemented method of claim 1, further comprising:
    progressively pruning, by one or more computer processors, at a lower sparsity to a target sparsity to identify the initial subnetwork.

7. The computer-implemented method of claim 1, further comprising:
    pruning, by one or more computer processors, one or more weights finetuned for a different language while applying on unstructured magnitude pruning on the initial subnetwork for a target language.

8. A computer program product comprising:
    one or more computer readable storage media and program instructions stored on the one or more computer readable storage media, the stored program instructions comprising:
    program instructions to obtain an initial subnetwork at a target sparsity and an initial pruning mask from a pre-trained self-supervised learning (SSL) speech model;
    program instructions to finetune the initial subnetwork, comprising:
        program instructions to zero out one or more masked weights in the initial subnetwork specified by the initial pruning mask;
        program instructions to train a new subnetwork from the zeroed out subnetwork;
        program instructions to prune one or more weights of lowest magnitude in the new subnetwork regardless of network structure to satisfy the target sparsity; and
    program instructions to classify an audio segment with the finetuned subnetwork.

9. The computer program product of claim 8, wherein the program instructions to obtain the initial subnetwork at the target sparsity and the initial pruning mask from a pre-trained SSL speech model, comprise:
    program instructions to apply task-agnostic subnetwork discovery on the pre-trained SSL speech model.

10. The computer program product of claim 9, wherein the program instructions for task-agnostic subnetwork discovery, comprise:
    program instructions to apply magnitude pruning at pre-trained initializations to the pre-trained SSL speech model.

11. The computer program product of claim 8, wherein the program instructions to finetune the initial subnetwork, comprise:
    program instructions to finetune on downstream automatic speech recognition tasks specified by a downstream loss.

12. The computer program product of claim 8, wherein the downstream loss is a connectionist temporal classification evaluated on a target dataset.

13. The computer program product of claim 8, wherein the program instructions, stored on the one or more computer readable storage media, further comprise:
    program instructions to progressively prune at a lower sparsity to a target sparsity to identify the initial subnetwork.

14. The computer program product of claim 8, wherein the program instructions, stored on the one or more computer readable storage media, further comprise:
    program instructions to prune one or more weights finetuned for a different language while applying on unstructured magnitude pruning on the initial subnetwork for a target language.

15. A computer system comprising:
    one or more computer processors;
    one or more computer readable storage media; and
    program instructions stored on the computer readable storage media for execution by at least one of the one or more processors, the stored program instructions comprising:
    program instructions to obtain an initial subnetwork at a target sparsity and an initial pruning mask from a pre-trained self-supervised learning (SSL) speech model;

program instructions to finetune the initial subnetwork, comprising:
- program instructions to zero out one or more masked weights in the initial subnetwork specified by the initial pruning mask;
- program instructions to train a new subnetwork from the zeroed out subnetwork;
- program instructions to prune one or more weights of lowest magnitude in the new subnetwork regardless of network structure to satisfy the target sparsity; and
- program instructions to classify an audio segment with the finetuned subnetwork.

16. The computer system of claim 15, wherein the program instructions to obtain the initial subnetwork at the target sparsity and the initial pruning mask from a pre-trained SSL speech model, comprise:
- program instructions to apply task-agnostic subnetwork discovery on the pre-trained SSL speech model.

17. The computer system of claim 16, wherein the program instructions for task-agnostic subnetwork discovery, comprise:
- program instructions to apply magnitude pruning at pre-trained initializations to the pre-trained SSL speech model.

18. The computer system of claim 15, wherein the program instructions to finetune the initial subnetwork, comprise:
- program instructions to finetune on downstream automatic speech recognition tasks specified by a downstream loss.

19. The computer system of claim 15, wherein the downstream loss is a connectionist temporal classification evaluated on a target dataset.

20. The computer system of claim 15, wherein the program instructions, stored on the one or more computer readable storage media, further comprise:
- program instructions to progressively prune at a lower sparsity to a target sparsity to identify the initial subnetwork.

* * * * *